United States Patent
Kim et al.

(10) Patent No.: US 11,169,676 B2
(45) Date of Patent: Nov. 9, 2021

(54) METHOD OF PROVIDING DOCUMENT EDITING SERVICE BASED ON BLOCK EDITOR, AND SERVER AND COMPUTER PROGRAM FOR EXECUTING THE SAME

(71) Applicant: MOCHA & JS CO., LTD., Anyang-si (KR)

(72) Inventors: Hyun Jun Kim, Seoul (KR); Seung Jik Lee, Siheung-si (KR)

(73) Assignee: MOCHA & JS CO., LTD., Anyang-si (KR)

( * ) Notice: Subject to any disclaimer, the term of this patent is extended or adjusted under 35 U.S.C. 154(b) by 0 days.

(21) Appl. No.: 17/007,138

(22) Filed: Aug. 31, 2020

(65) Prior Publication Data

US 2021/0141516 A1    May 13, 2021

(30) Foreign Application Priority Data

Nov. 12, 2019  (KR) ........................ 10-2019-0143921

(51) Int. Cl.
| | | |
|---|---|---|
| G06F 17/10 | (2006.01) | |
| G06F 3/0484 | (2013.01) | |
| G06K 9/00 | (2006.01) | |
| G06F 16/957 | (2019.01) | |
| G06F 3/0481 | (2013.01) | |

(52) U.S. Cl.
CPC ...... *G06F 3/04845* (2013.01); *G06F 3/04812* (2013.01); *G06F 3/04842* (2013.01); *G06F 16/9577* (2019.01); *G06K 9/00456* (2013.01); *G06K 9/00463* (2013.01)

(58) Field of Classification Search
CPC ............ G06F 3/04845; G06F 3/04842; G06F 16/9577; G06K 9/00456; G06K 9/00463
See application file for complete search history.

(56) References Cited

U.S. PATENT DOCUMENTS

| | | | | |
|---|---|---|---|---|
| 5,121,499 A | * | 6/1992 | McCaskill | G06F 40/174 715/212 |
| 6,640,234 B1 | * | 10/2003 | Coffen | G06F 40/18 715/219 |
| 2015/0116362 A1 | * | 4/2015 | Aurongzeb | G06F 1/1677 345/650 |

FOREIGN PATENT DOCUMENTS

| | | | | |
|---|---|---|---|---|
| CN | 105912206 A | * | 8/2016 | |
| GB | 8716616 | * | 8/1987 | ........... G06F 40/103 |
| JP | 08137659 A | * | 5/1996 | |
| WO | WO-2012017056 A1 | * | 2/2012 | ............. G06F 40/18 |

\* cited by examiner

*Primary Examiner* — Shahid K Khan
(74) *Attorney, Agent, or Firm* — Novick, Kim & Lee, PLLC; Sang Ho Lee; Hyun Woo Shin

(57) ABSTRACT

Provided is a method of providing a document editing service based on a block editor, and a server and a computer program for executing the same, and the method includes the steps of: setting, for a first block in which a cursor indicating an editing position is positioned among the plurality of blocks, an attribute of a content element corresponding to the first block to a first value; receiving a user input for the cursor and confirming a moving direction of the cursor; setting an attribute of a content element corresponding to a second block among blocks adjacent to the first block to a first value, and setting an attribute of a content element corresponding to a third block to a second value, based on the moving direction of the cursor; and processing to move the cursor to the second block on the edit screen.

9 Claims, 8 Drawing Sheets

METHOD OF PROVIDING DOCUMENT EDITING SERVICE BASED ON BLOCK EDITOR, AND SERVER AND COMPUTER PROGRAM FOR EXECUTING THE SAME

CROSS-REFERENCE TO RELATED APPLICATIONS

This application claims priority to Korean Patent Application No. 10-2019-0143921 filed on Nov. 12, 2019, in the Korean Intellectual Property Office, the disclosure of which is incorporated herein by reference.

BACKGROUND OF THE INVENTION

Field of the Invention

The present invention relates to a service for editing a document including various content elements based on a block editor.

Background of the Related Art

Today, computer users may receive quickly a large amount of information of various forms using the Internet. Through Internet search, Internet users may easily access information they need, such as information on meaning of words, information related to books, information related to journals or papers, information on Internet newspaper articles, information on products of Internet shopping malls, or the like anytime and anywhere.

Information exchange is made on the Internet web by recording questions or answers in the form of bulletin boards or comments so that information may be exchanged between Internet users.

The main stream of general document editors on the web is a simple form of inputting and storing necessary sentences using Korean or English language. At this point, a text editor having a function capable of changing a character size or a font, specifying a color, and putting an underline is provided in some cases.

Recently, as various content elements such as images, tables, links and the like, in addition to simple sentences, are included in a document, block editor tools, which allow editing of a document including the various content elements by the block, are developed and provided.

However, in editing a document using the block editor as described above, there is a difficulty in moving from an editing area to another according to user input since various content elements are randomly arranged.

SUMMARY OF THE INVENTION

Therefore, the present invention has been made in view of the above problems, and it is an object of the present invention to provide a method of providing a document editing service based on a block editor, and a server and a computer program for executing the same.

To accomplish the above object, according to one aspect of the present invention, there is provided a method of providing a document editing service based on a block editor having a plurality of blocks arranged on an edit screen for each content element, the method comprising the steps of: setting, for a first block in which a cursor indicating an editing position is positioned among the plurality of blocks, an attribute of a content element corresponding to the first block to a first value; receiving a user input for the cursor and confirming a moving direction of the cursor; setting an attribute of a content element corresponding to a second block among blocks adjacent to the first block to a first value, and setting an attribute of a content element corresponding to a third block to a second value, based on the moving direction of the cursor; and processing to move the cursor to the second block on the edit screen.

The plurality of blocks may correspond to any one among a text, an image, a table, a link, and a paragraph, respectively, and may be classified according to whether the cursor may move into the blocks.

The attribute may indicate whether a content element corresponding to the block is editable, and when the document is stored as an HTML source using JavaScript, the attribute may be contenteditable attribute that may be set for each content element included in the HTML source.

Meanwhile, at least some of the steps according to the method of providing a document editing service using a block editor may be configured as a computer program to be executed on a server or a web browser according to an embodiment of the present invention, and the computer program may be stored in a computer-readable medium.

The server device according to an embodiment of the present invention may perform the method of providing a document editing service using a block editor.

DETAILED DESCRIPTION OF THE PREFERRED EMBODIMENT

Figure 1:
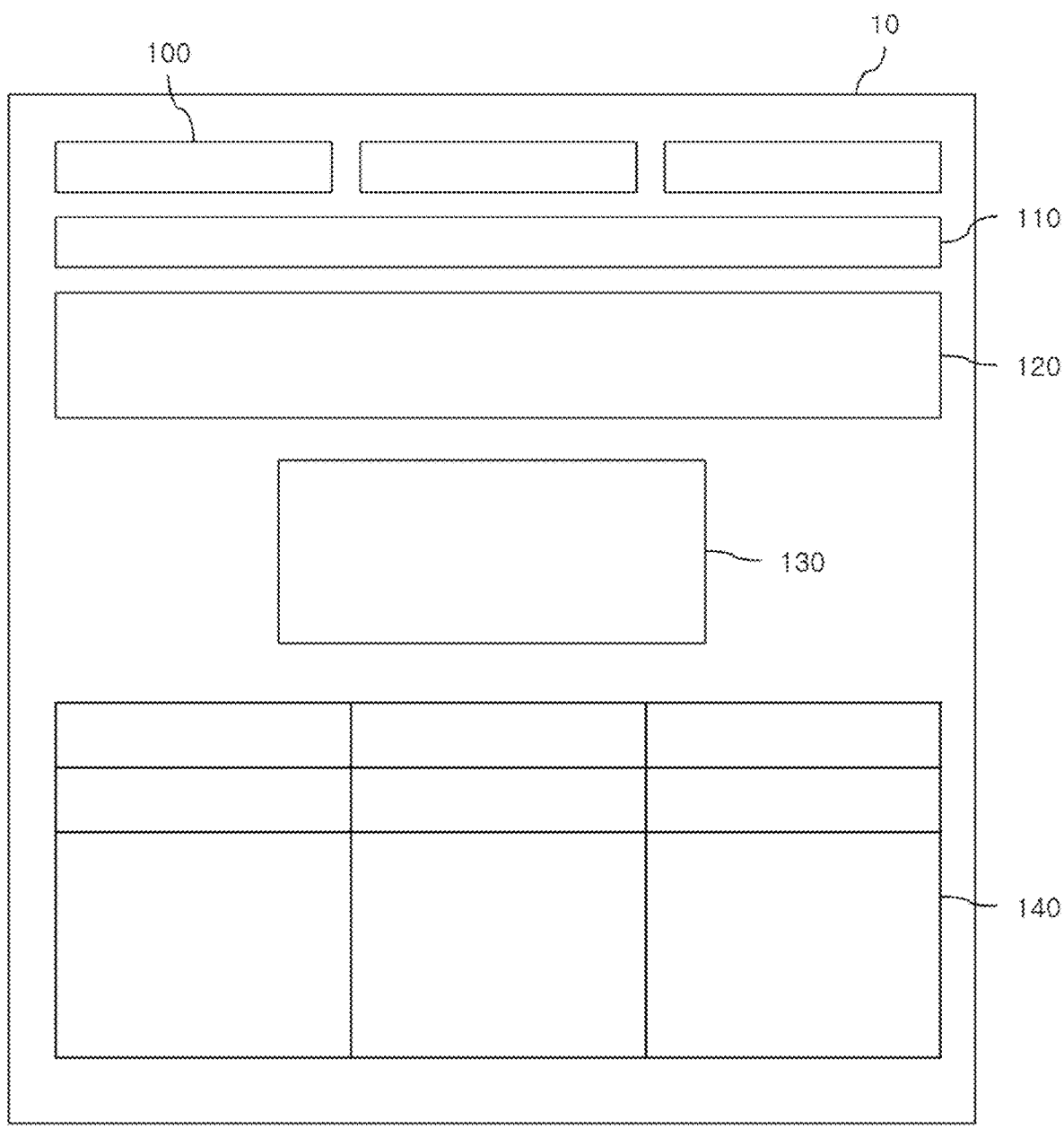
FIG. 1 is a view showing an example of a document editing service based on a block editor.

The following description merely illustrates the principles of the present invention. Therefore, those skilled in the art may implement the principles of the present invention although they are not clearly described or shown in this specification, and may invent various devices included in the concept and scope of the present invention. In addition, it should be understood that all conditional terms and embodiments listed in this specification are clearly intended only for the purpose of understanding the concept of the present invention in principle, and not limited to the specially listed embodiments and states.

In addition, it should be understood that all detailed descriptions that list specific embodiments, as well as the principles, aspects and embodiments of the present invention, are intended to include structural and functional equivalents of these matters. In addition, it should be understood that these equivalents include not only currently publicized equivalents, but also equivalents to be developed in the future, i.e., all devices invented to perform the same function regardless of the structure.

Accordingly, for example, it should be understood that the block diagrams of this specification represent conceptual views of exemplary circuits embodying the principles of the present invention. Similarly, it should be understood that all flowcharts, state transition diagrams, pseudo codes, and the like may be practically expressed in a computer-readable medium, and represent various processes executed by a computer or a processor regardless of whether the computer or the processor is explicitly shown.

The functions of various devices shown in the drawings including processors or functional blocks expressed as a concept similar to the processors may be provided by using dedicated hardware as well as hardware capable of executing software in relation to appropriate software. When a function is provided by a processor, the function may be provided by a single dedicated processor, a single shared processor, or a plurality of individual processors, and some of the processors may be shared.

The objects, features and advantages described above will become more apparent through the following detailed description related to the accompanying drawings, and accordingly, those skilled in the art may easily implement the spirit of the present invention. In addition, when it is determined, in describing the present invention, that the detailed description of the known techniques related to the present invention may unnecessarily obscure the subject matters of the present invention, the detailed description will be omitted.

Hereinafter, preferred embodiments of the present invention will be described in detail with reference to the accompanying drawings.

Hereinafter, the present invention will be described in detail based on the drawings accompanied with specific description.

FIG. 1 is a view showing an example of a document editing service based on a block editor, which shows an edit screen of a block editor for editing documents.

Referring to FIG. 1, the block editor is an editor of new approach used for document editing, and the blocks 100 to 140 are content elements added to the edit screen 10 to create a content layout.

That is, a document editing service according to the present invention may be provided by using a block editor in which a plurality of blocks 100 to 140 respectively corresponding to the content elements constituting a document is disposed on the edit screen 10.

For example, although the plurality of blocks 100 to 140 may respectively correspond to any one content element among a text, an image, a table, a link, and a paragraph, the present invention is not limited thereto.

In the case of an existing editor, the entire document is an edit area, whereas in the case of using the block editor as described above, as the edit area may be separated for each section of a document, a document may be generated by combining a plurality of independent content elements by the block.

However, in contrast to the advantage of configuring an independent editing environment for each of the blocks 100 to 140, since the editing area is limited to the inside of each block, the blocks are in a state closed from each other, and there may be a problem in that a cursor or a caret indicating an editing position is difficult to move around the blocks.

According to an embodiment of the present invention, as the attributes of the content elements are set and changed to be different from each other according to a moving direction of the cursor with respect to the plurality of blocks 100 to 140 arranged on the edit screen 10 in correspondence to the content elements, users' convenience such as moving the editing position around the blocks may be improved in editing a document using the block editor.

Hereinafter, embodiments of a method of providing a document editing service based on a block editor according to the present invention will be described in more detail with reference to FIGS. 2 to 8.

Figure 2:
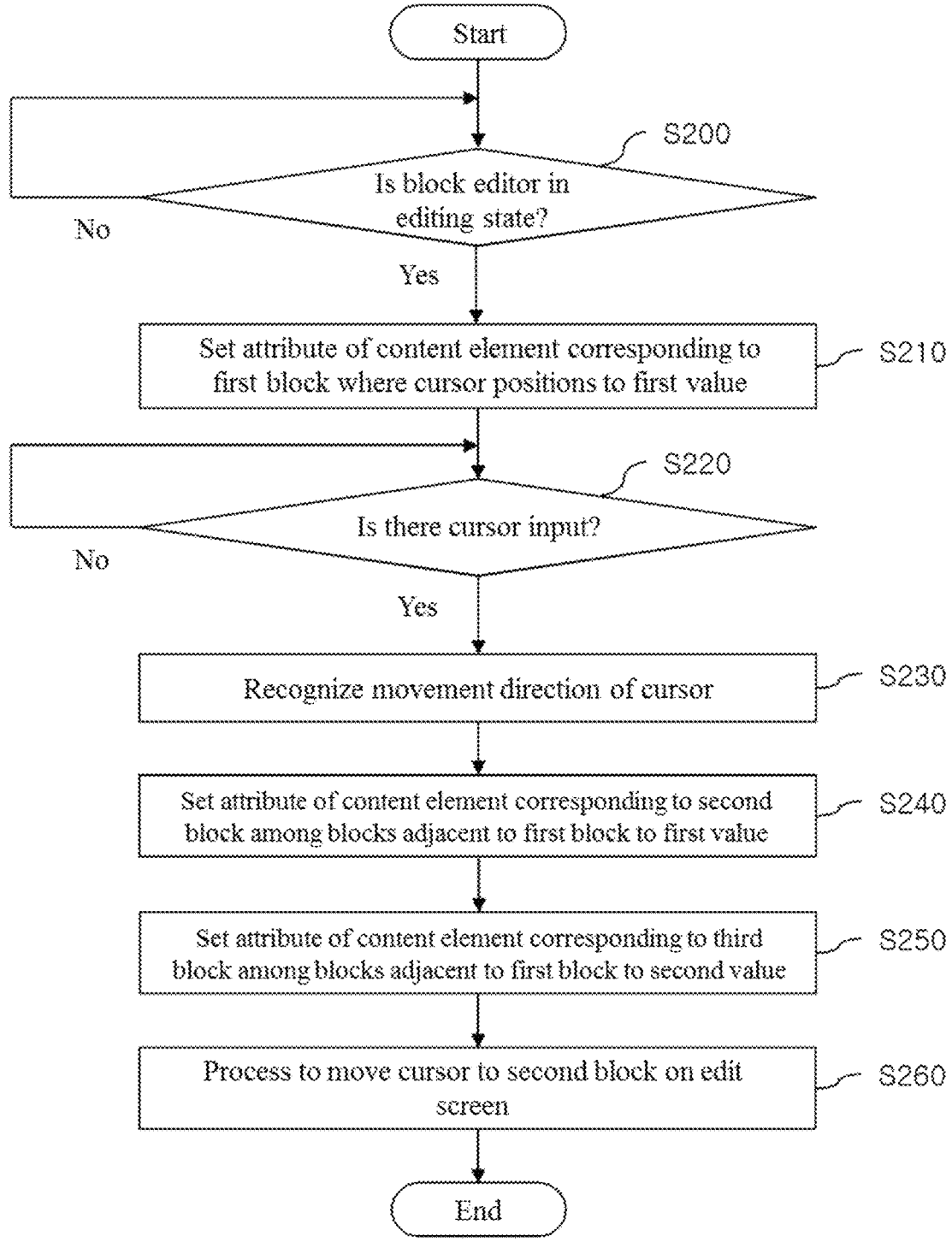
FIG. 2 is a flowchart illustrating an embodiment of a method of providing a document editing service based on a block editor according to the present invention.

FIG. 2 is a flowchart illustrating an embodiment of a method of providing a document editing service based on a block editor according to the present invention.

Referring to FIG. 2, first, it is confirmed whether the block editor is in an editing state (S200).

Figure 3:
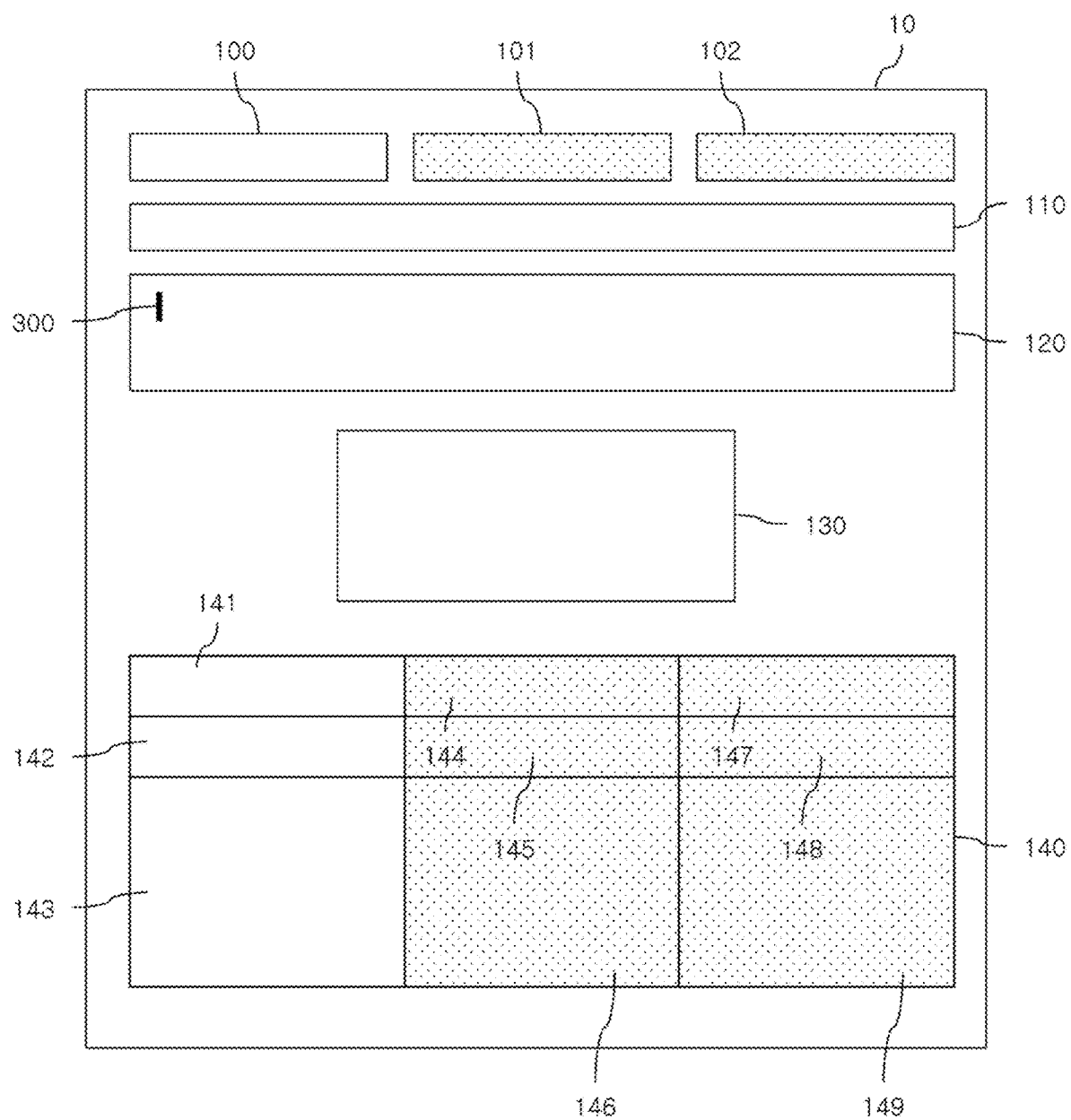
FIG. 3 is a view showing an embodiment of a method of classifying a plurality of blocks according to whether a cursor may move into the blocks.
Figure 4:
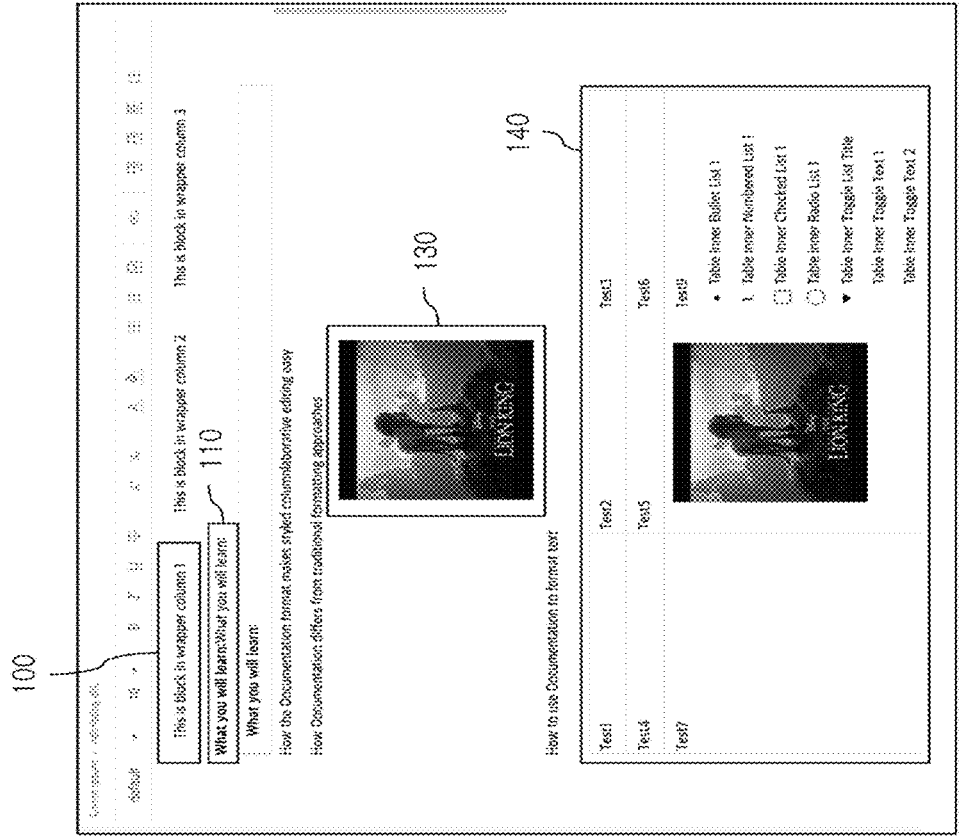
FIGS. 4 to 8 are views illustrating embodiments of a method of changing and setting the attribute of a content element corresponding to each block according to cursor input of a user.
Figure 5:
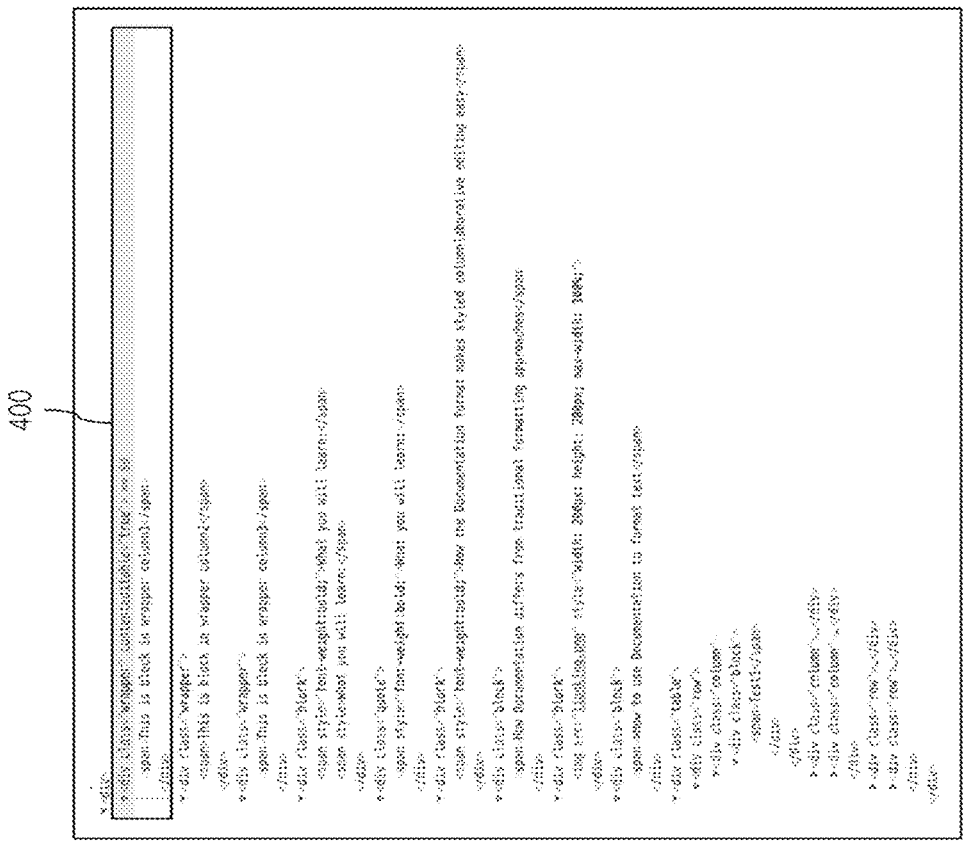
Figure 5:
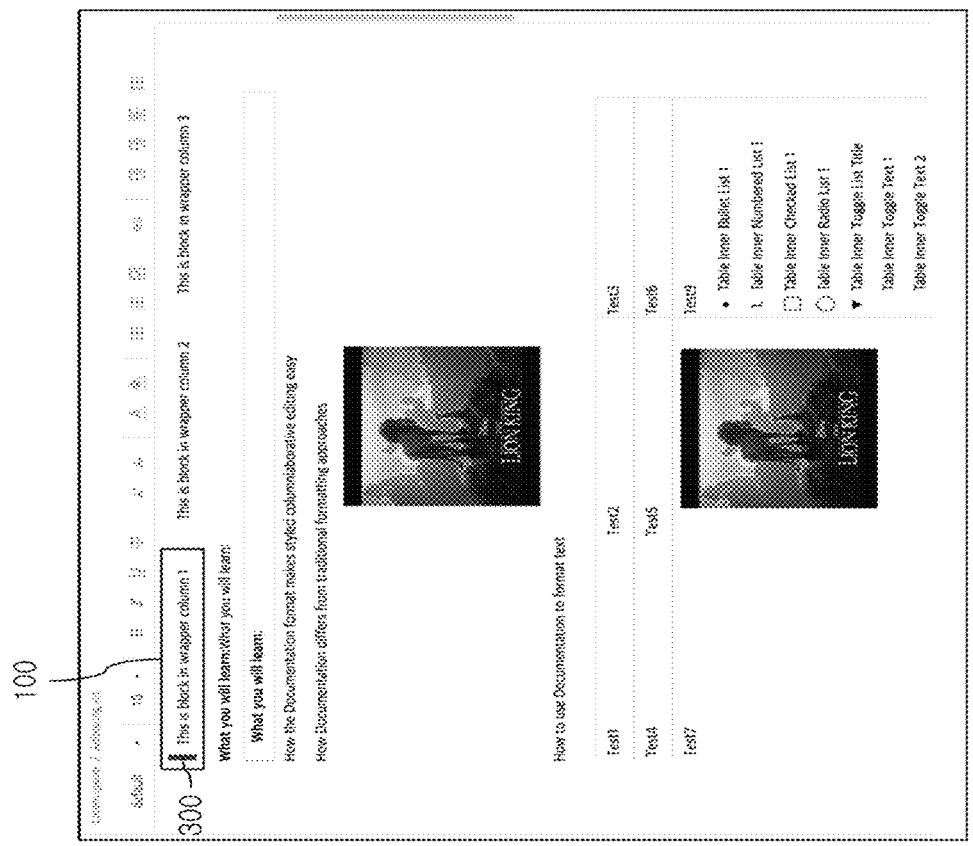

As shown in FIG. 3, in the block editor, blocks 100 to 149 respectively corresponding to a specific content element are arranged on the edit screen 10 to configure a document.

As described above, the blocks arranged on the edit screen 10 may respectively correspond to any one among various content elements such as a text, an image, a table, a link, a paragraph, and the like.

For example, a plurality of wrapper columns 100, 101 and 102 may be arranged at the top of the edit screen 10 to configure the upper part of the document.

In addition, blocks 110 and 120 including text may be arranged on the edit screen 10, and a block 130 including an image may be arranged in the middle.

Meanwhile, a block 140 including a table may be arranged at the bottom of the edit screen 10 to configure the lower part of the document, and the block 140 may be partitioned into a plurality of independently editable blocks 141 to 149.

Here, the user may select and edit a specific block 120 arranged on the edit screen 10, and at this point, as a cursor 300 is positioned to be displayed on a corresponding block 120 as shown in FIG. 3, the block editor may be in an editing state.

The cursor 300 is a type of pointer indicating the editing position, and the present invention is not limited to the cursor, and may be applicable to various symbols showing the editing position like a caret or the like.

Meanwhile, the plurality of blocks arranged on the edit screen 10 may be classified according to whether the cursor 300 may move into the blocks.

For example, as shown in FIG. 3, when the cursor 300 is positioned at a specific block 120, the other blocks may be classified into blocks 100, 110, 130, 141, 142 and 143 to which the cursor 300 may move from the current block 120, and blocks 101, 102, 144, 145, 146, 147, 148 and 149 to which the cursor 300 may not move.

In this case, since the attributes of corresponding content elements are set to be different from each other in the blocks 100, 110, 130, 141, 142 and 143 to which the cursor 300 may move and in the blocks 101, 102, 144, 145, 146, 147, 148 and 149 to which the cursor 300 may not move, the cursor 300 may freely move around the blocks according to the user's habit.

According to an embodiment of the present invention, the document generated as described above may be configured as a Hypertext Mark-up Language (HTML) source using JavaScript, and stored, edited and transferred in the form of an HTML source.

For example, in the block editor of a basic state, the block arrangement of the block editor shown in FIG. 4(a) may be configured as an HTML source as shown in FIG. 4(b).

That is, each block may be designated as a different class in the HTML source according to the type of a corresponding content element, and contents of the content element may be included in the HTML source.

More specifically, the wrapper column block 100 at the top may be configured as a content element 400 of which the class is designated as "wrapper" in the HTML source, and the text block 110 and the image block 130 may be configured as content elements 410 and 430 of which the class is designated as "block" in the HTML source, respectively.

Meanwhile, the table block 140 may be configured as a content element 440 of which the class is designated as "table" in the HTML source.

In the block editor of a basic state as described above with reference to FIG. 4, the user may select a specific block and position the cursor 300 so that the block editor may be in an editing state.

When the block editor is in an editing state, for a first block in which the cursor 300 indicating the editing position is positioned among the plurality of blocks, the attribute of the content element corresponding to the first block is set to a first value (S210).

Here, the attribute of the content element indicates whether the content element corresponding to the block is editable.

For example, as described above, when a document generated by the block editor is configured as an HTML source using JavaScript, the attribute may be "contenteditable" that may be set for each content element included in the HTML source.

Referring to FIG. 5(a), when the user selects the wrapper column 1 block 100 and the cursor 300 is positioned in the block, the block editor may be in an editing state.

At this point, as shown in FIG. 5(b), for the content element 400 corresponding to the wrapper column 1 block 100 in which the cursor 300 is positioned in the HTML source, attribute "contenteditable" may be specified as "true", which is a first value.

In this way, the content element 400 for which attribute "contenteditable" is set to "true" becomes an editable state such as input or the like, and a content element for which attribute "contenteditable" is set to "false" may become an uneditable state.

When there is a user's cursor input in the editing state (S220), a user input for the cursor 300 is received, and the moving direction of the cursor 300 is recognized (S230).

Then, based on the moving direction of the cursor 300 recognized at step S230, the attribute of the content element corresponding to the second block among the blocks adjacent to the first block is set to a first value (S240), and the attribute of the content element corresponding to the third block is set to a second value (S250), and it is processed to move the cursor 300 to the second block on the edit screen (S260).

Here, when the user enters a cursor movement key, the attribute for the entire document in the HTML source may be set to the first value, and the attribute of the content element may be set to the first value for the second block corresponding to the user's cursor movement direction, to which the cursor may move, among the blocks adjacent to the first block, and the attribute of the content element may be changed to the second value for the third block to which the cursor may not move since it does not correspond to the user's cursor movement direction.

Figure 6:
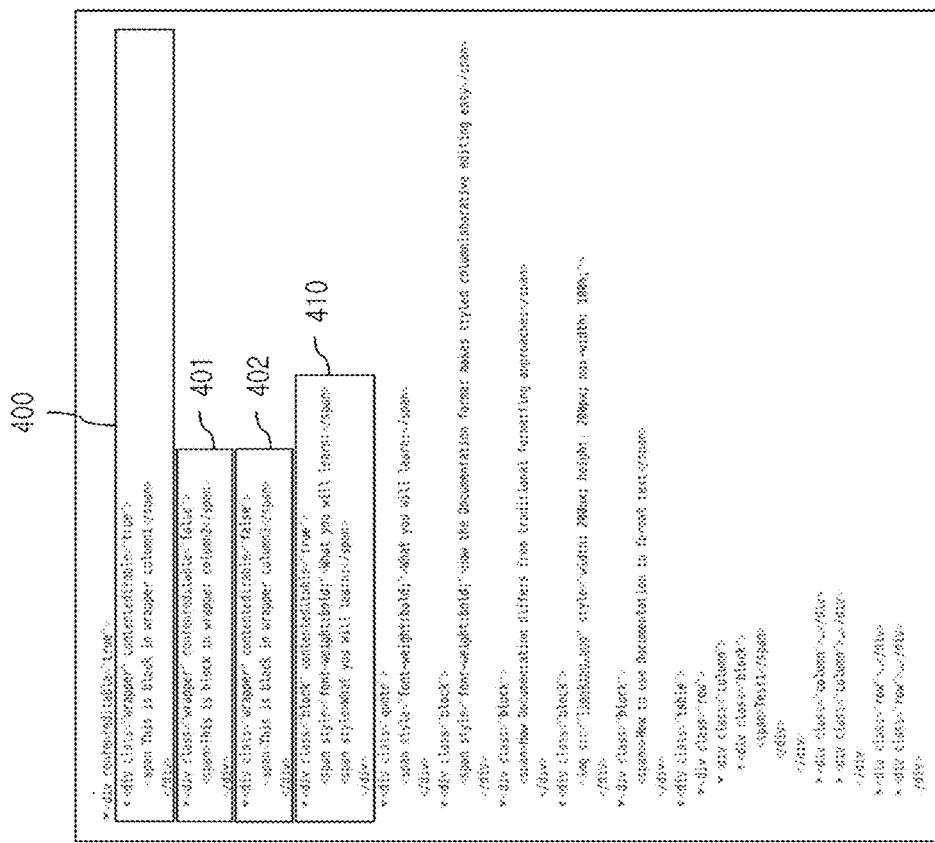
Figure 6:
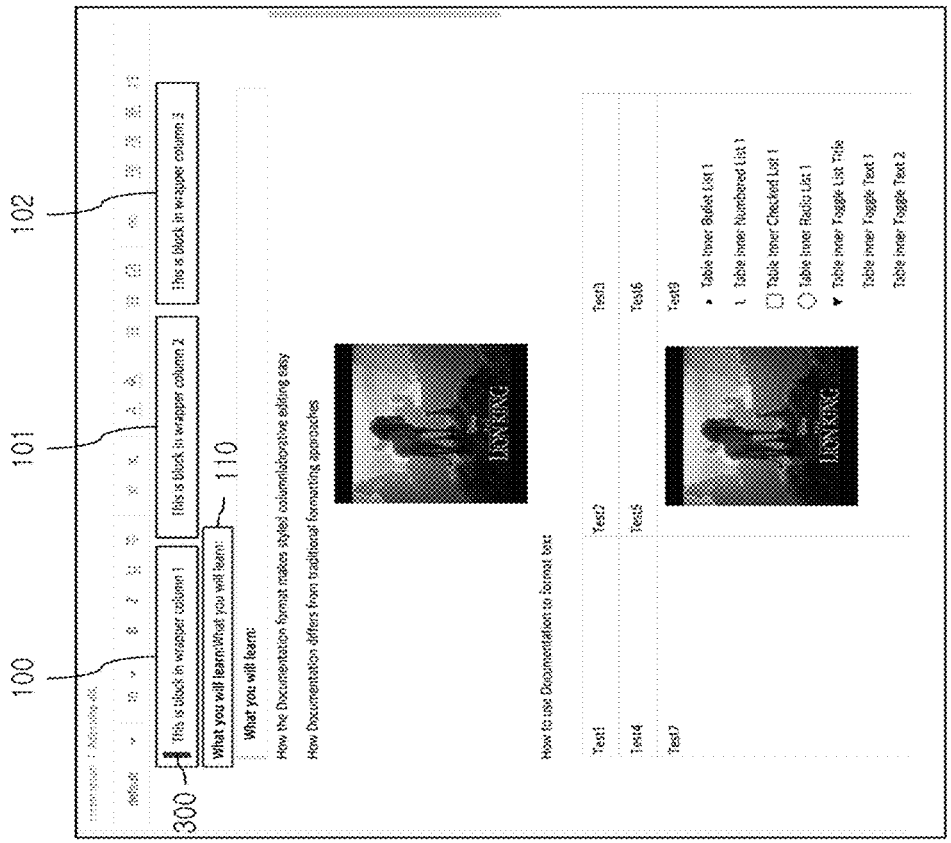

For example, when a user inputs a downward movement key at the terminal to move the cursor 300 positioned in the wrapper column 1 block 100 to the lower side, as shown in FIG. 6, attribute "contenteditable" for the HTML source may be automatically set to "true", which is the first value.

In addition, attributes "contenteditable" of the content elements 401 and 402 corresponding to the blocks 101 and 102 adjacent on the right side of the wrapper column 1 block 100 are automatically changed to "false", which is the second value, and the attribute of the content element 410, which is adjacent on the lower side of the wrapper column 1 block 100 and corresponds to the text block 110 to which the cursor may move, may be automatically set to "true", which is the first value.

Figure 7:
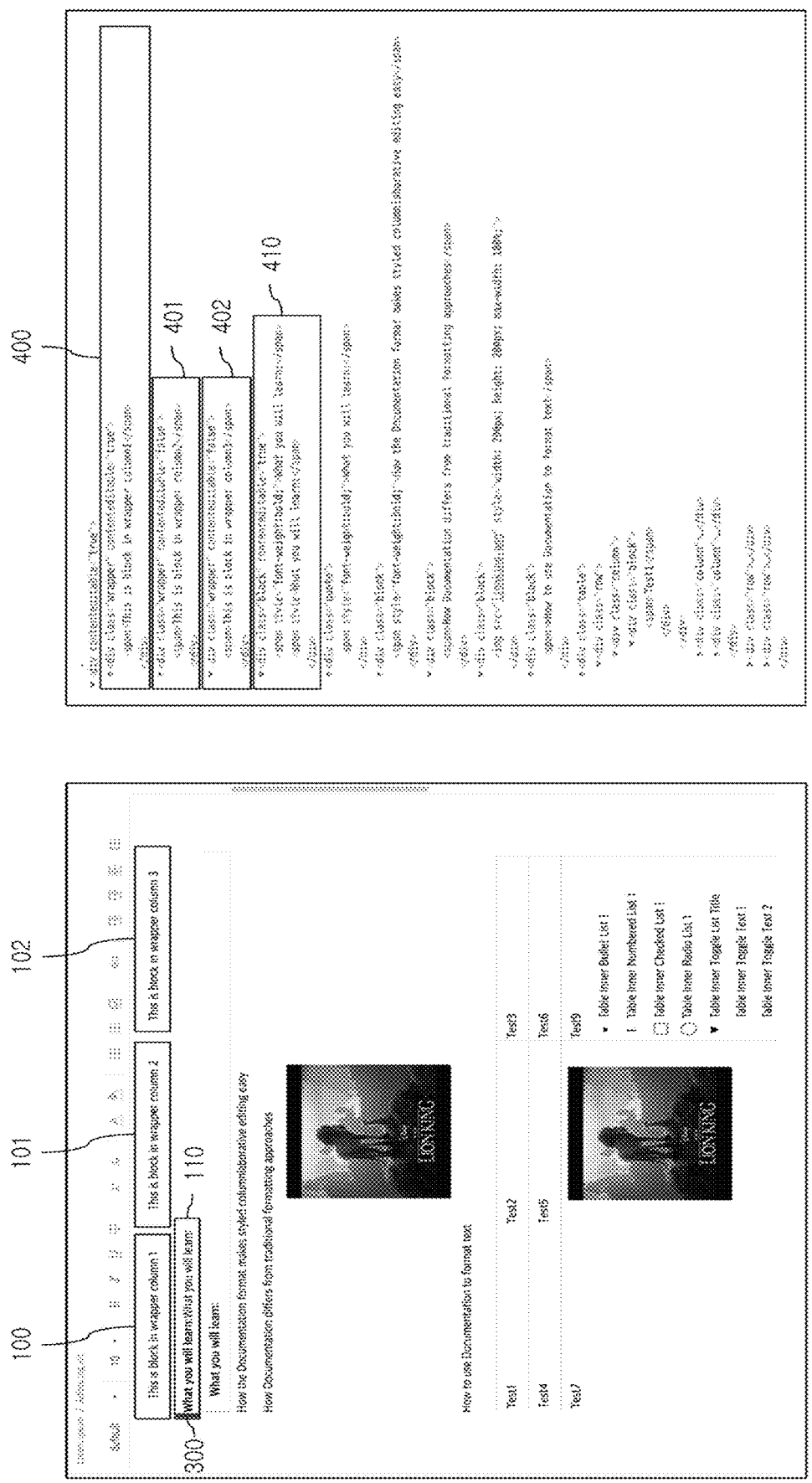

As the state information of attributes "contenteditable" of content elements corresponding to neighboring blocks is changed to "true" or "false" based on the cursor movement direction as described above, when the user inputs the cursor downward movement key, the cursor 300 may move to the text block 110 on the lower side as shown in FIG. 7.

Figure 8:
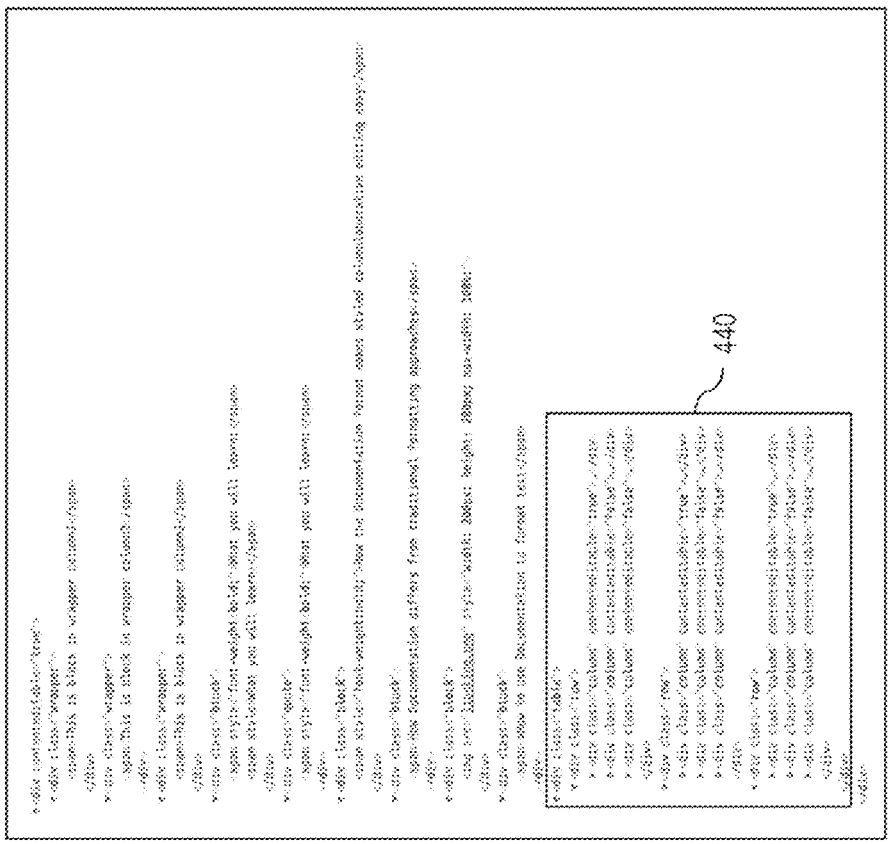
Figure 8:
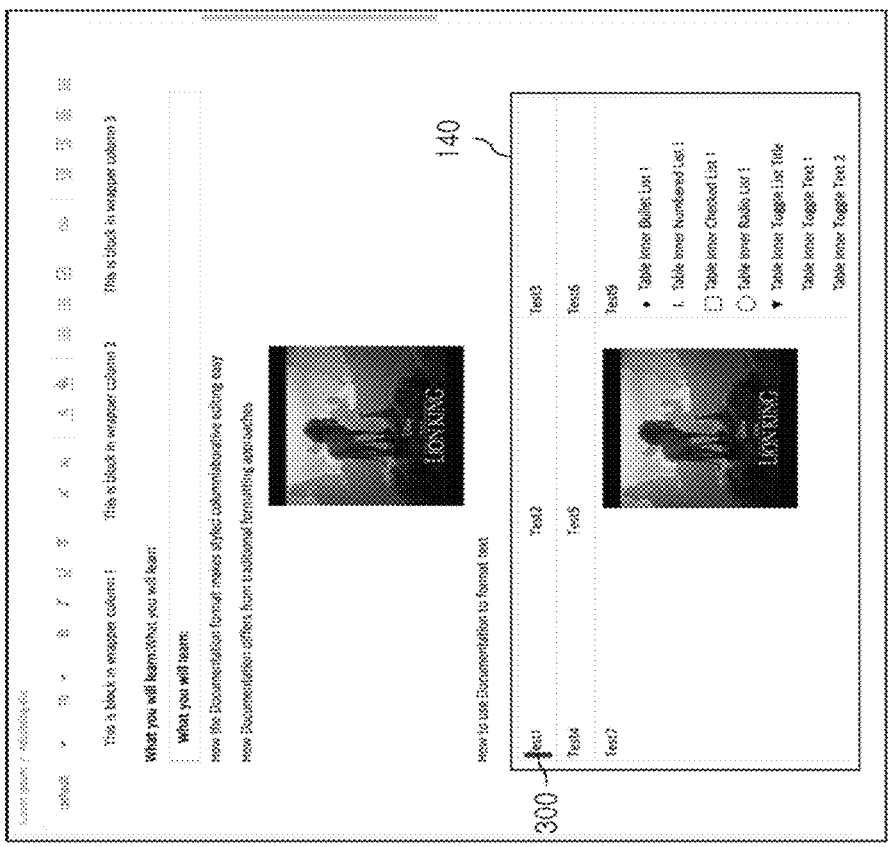

Referring to FIG. 8, when the user inputs the downward movement key to move the cursor 300 positioned in the table block 140 to the lower side, in the content element 440 expressing a corresponding table in the HTML source, attributes "contenteditable" of content elements corresponding to lower blocks to which the cursor may move from the current block is automatically set to "true", and attributes "contenteditable" of content elements corresponding to the blocks of the other columns may be automatically set to "false".

The server device according to an embodiment of the present invention may provide a block editor-based document editing service of the method that has been described with reference to FIGS. 1 to 8.

For example, the server device according to an embodiment of the present invention may perform all or some of the steps included in the method as described above.

When the server device according to an embodiment of the present invention performs only some of the steps included in the method as described above, the remaining steps may be performed on the user's terminal.

Meanwhile, the method of providing a document editing service based on a block editor according to an embodiment of the present invention may be used to edit a document in a cloud environment.

According to an embodiment of the present invention, as the attributes of the content elements are set and changed to be different from each other according to a moving direction of the cursor with respect to the plurality of blocks 100 to 140 arranged on the edit screen 10 in correspondence to the content elements, users' convenience such as moving the editing position around the blocks may be improved in editing a document using the block editor.

The methods according to an embodiment of the present invention as described above may be manufactured as a program for being executed on a computer and stored in a computer-readable recording medium, and examples of the computer-readable recording medium include ROM, RAM, and CD-ROM, a magnetic tape, a floppy disk, an optical data storage device, and like.

The computer-readable recording medium may be distributed in computer systems connected through a network so that computer-readable codes may be stored and executed in a distributed manner. In addition, functional programs, codes, and code segments for implementing the method may be easily inferred by the programmers in the technical field to which the present invention belongs.

As described above, it will be understood that the technical configuration of the present invention described above may be implemented in other specific forms by those skilled in the art without changing the technical spirit or essential features of the present invention.

Therefore, it should be understood that the embodiments described above are illustrative, not restrictive, in all respects, and it should be interpreted that the scope of the present invention is specified by the claims described below rather than the detailed description described above, and the meaning and scope of the claims and all changed or modified forms derived from the equivalent concept thereof are included in the scope of the present invention.

What is claimed is:

1. A method of providing an editing service of a document based on a block editor having a plurality of blocks arranged on an edit screen for each content element, the method comprising:
    setting, for a first block among the plurality of blocks in which a cursor indicating an editing position is positioned, an attribute of a content element corresponding to the first block to a first value;
    receiving a user input for the cursor and confirming a moving direction of the cursor;
    setting an attribute of a content element corresponding to a second block among blocks adjacent to the first block to the first value, and setting an attribute of a content element corresponding to a third block to a second value, based on the moving direction of the cursor; and
    processing to move the cursor to the second block on the edit screen,
    wherein the document is configured as an HTML source using JavaScript, and the attribute is contenteditable attribute that may be set for the each content element included in the HTML source.

2. The method according to claim 1, wherein each of the plurality of blocks corresponds to any one among a text, an image, a table, a link, and a paragraph.

3. The method according to claim 1, further comprising classifying each of the plurality of blocks according to whether the cursor may move into the each of the plurality of blocks.

4. The method according to claim 1, wherein the attribute indicates whether the content element corresponding to the block is editable.

5. The method according to claim 1, further comprising setting an attribute for all of the document to the first value.

6. The method according to claim 5, wherein the attribute of the content element corresponding to the third block is changed to the second value.

7. The method according to claim 1, wherein the second block is a block corresponding to the moving direction of the cursor, to which the cursor may move, among the blocks adjacent to the first block.

8. A computer program stored in a non-transitory computer-readable recording medium to execute the method according to claim 1 using a computer.

9. A server device for executing the method according to claim 1 using a computer.

* * * * *